(12) United States Patent
Smith et al.

(10) Patent No.: US 8,798,039 B2
(45) Date of Patent: Aug. 5, 2014

(54) VOICE OVER INTERNET PROTOCOL (VOIP) TRAFFIC MANAGEMENT SYSTEM AND METHOD

(75) Inventors: Michael R. Smith, Monument, CO (US); Timothy R. Ness, Raleigh, NC (US); Timothy J. Mason, Swisher, IA (US); Michael J. Coons, Parker, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 141 days.

(21) Appl. No.: 13/456,780

(22) Filed: Apr. 26, 2012

(65) Prior Publication Data

US 2013/0286861 A1 Oct. 31, 2013

(51) Int. Cl.
*H04L 12/66* (2006.01)

(52) U.S. Cl.
USPC .......................................... 370/352

(58) Field of Classification Search
USPC ......... 370/241–253, 351–352, 395.5–395.52, 370/400–401; 379/9, 9.02, 9.03, 9.04, 379/15.01–16
See application file for complete search history.

(56) References Cited

U.S. PATENT DOCUMENTS

| | | | |
|---|---|---|---|
| 6,081,518 A * | 6/2000 | Bowman-Amuah | 370/352 |
| 8,040,811 B2 * | 10/2011 | Edwards et al. | 370/241 |
| 2006/0067298 A1 * | 3/2006 | Houck et al. | 370/352 |
| 2009/0161657 A1 * | 6/2009 | Chung et al. | 370/352 |

* cited by examiner

*Primary Examiner* — Frank Duong

(57) ABSTRACT

A method is provided that includes: receiving, by one or more server devices, voice over Internet protocol (VoIP) traffic management rules from a network operations center; gathering, by the one or more server devices, VoIP traffic data from a VoIP network; analyzing, by the one or more server devices, the VoIP traffic data; creating, by the one or more server devices, a ticket based on the VoIP traffic management rules and the VoIP traffic data; and automatically sending, by the one or more server devices, the ticket to the network operations center based on the VoIP traffic management rules.

20 Claims, 12 Drawing Sheets

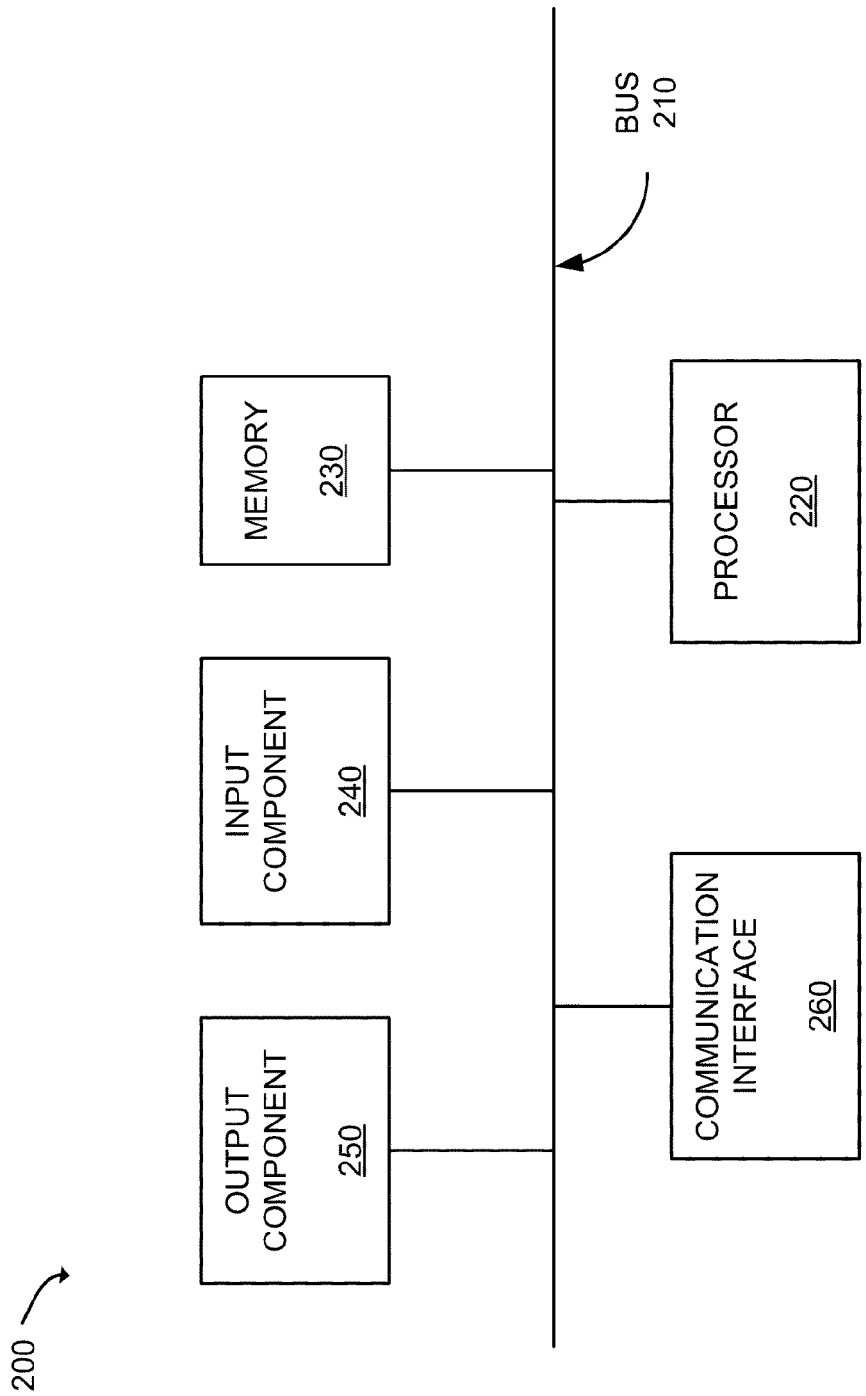

VOICE OVER INTERNET PROTOCOL (VOIP) TRAFFIC MANAGEMENT SYSTEM AND METHOD

BACKGROUND

Voice over Internet Protocol (Voice over IP, VoIP) includes a family of methodologies, communication protocols, and transmission technologies for delivery of voice communications and multimedia sessions over IP networks, such as the Internet. The steps involved in originating a VoIP telephone call include signaling and media channel setup, digitization of the analog voice signal, encoding, packetization, and transmission as IP packets over a packet-switched network.

VoIP can be used for voice or multimedia communications. VoIP transports these communications via the Internet, rather than the Public Switched Telephone Network (PSTN).

As VoIP utilizes the Internet, Quality of Service (QoS) issues may arise due to Internet problems, such as network congestion, latency, or jitter. Other QoS issues for VoIP may arise due to faults or miscommunications with hardware (e.g., server devices, customer equipment, etc.). Problems that can occur that would affect QoS can include "terminating route looping," which can include situations when telephone numbers are misrouted to incorrect or unconnected locations; "registration storms," which can include customer mis-configuration of registrations that can cause VoIP telephones to re-register at shorter time intervals causing system overload; or "call quality traffic," which can include irregularly high traffic due to customers hanging up and re-dialing for a better connection.

BRIEF DESCRIPTION OF THE DRAWINGS

FIG. 2 is a diagram of example components of one or more of the devices of FIGS. 1A and 1B;

DETAILED DESCRIPTION OF PREFERRED EMBODIMENTS

The following detailed description refers to the accompanying drawings. The same reference numbers in different drawings may identify the same or similar elements.

A system and/or method, described herein, may provide components for VoIP traffic management to increase the QoS for VoIP users. As described herein, the components can be used to monitor and correct problems in a VoIP system. The components can include a monitoring component, an analysis component, and a reporting component. These components can create alarms and/or tickets, which can notify a Network Operations Center (NOC) of QoS issues. These alarms and/or tickets can alert a NOC of problems, and the NOC can find and resolve these problems based upon the alarms and tickets. For example, alarms can include notifications to the NOC that particular QoS issues may be occurring, and tickets can include requests for action by the NOC to address QoS issues.

Additionally, a NOC can provide parity between existing TDM traffic management and VoIP traffic management to enable a Global Network Operations (GNO) to proactively recognize customer-impacting problems, and also effectively research call failures and failure patterns to resolve problems and improve network performance.

Figure 1A:
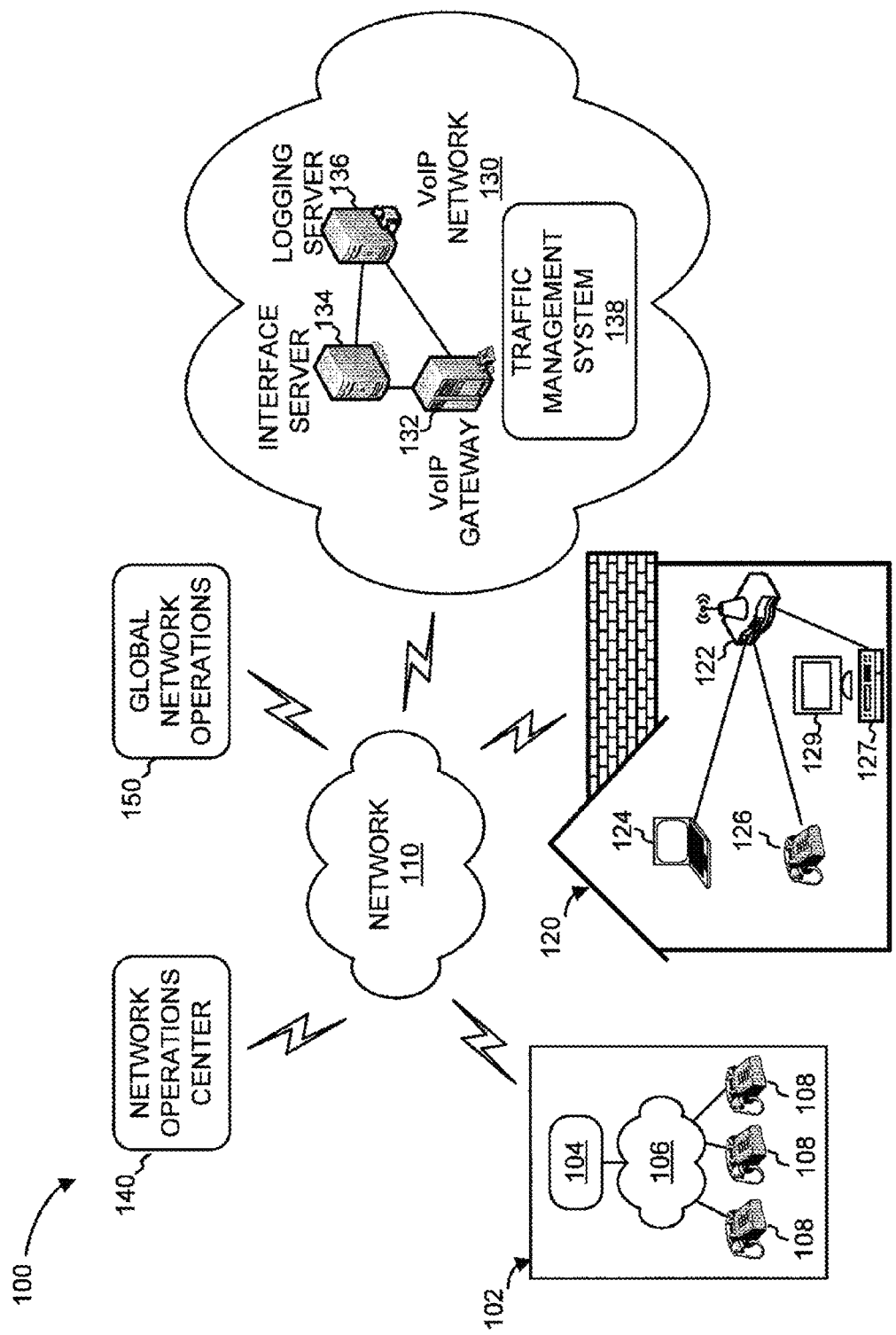
FIG. 1A is a diagram of an overview of example implementations, described herein.

FIG. 1A is a diagram illustrating an example of an environment 100 in which the components to manage VoIP traffic, as described herein, may be implemented. Environment 100 may include a network 110 that is used to connect a number of entities together to enable VoIP services. The entities may include a business location 102, a residential location 120, a VoIP network 130, a NOC 140, and a GNO 150. The VoIP network 130 may include provider infrastructure for enabling the VoIP services and managing traffic, and may include a VoIP gateway 132, an interface server 134, a logging server 136, and a traffic management system 138.

Network 110 may include a Local Area Network (LAN), a Wide Area Network (WAN), a Metropolitan Area Network (MAN), a wireless network, an optical fiber (or fiber optic)-based network, a cable television network, a satellite television network, or a combination of networks. Network 110 may be implemented as an IP network. In one implementation, network 110 may include the Internet.

Business location 102 and/or residential location 120 may include a commercial or residential entity that is connected to network 110. Business location 102 and/or residential location 120 may be connected to network 110 using, for example, a fiber optic connection, a coaxial connection, a satellite connection, or another type of wireless or wired connection. A gateway device may be used to connect business location 102 and/or residential location 120 to network 110. For example, for a fiber optic connection, an Optical Network Terminal (ONT) may convert the optical signals into an electrical format that can be used by a wireless router 122, an enterprise router, a wholesale gateway switch, or some other customer interconnect device. Alternatively, the functionality of the ONT may be incorporated into wireless router 122, or other device.

Devices in business location 102 and/or residential location 120 may include, for example, business networking equipment (e.g., enterprise gateway 104, business network 106, etc.). home networking equipment (e.g., wireless router 122, other routers, cables, splitters, local gateways, etc.), computers (e.g., a computer 124), telephone devices (e.g., telephone device 126), Set-Top Boxes (STB) (e.g., a STB 127), and televisions (e.g., a television 129). Additionally, although only a STB 127, a television 129, a computer 124, a telephone device 126, and wireless router 122 are shown in FIG. 1A, it can be appreciated that any particular business location 102 and/or residential location 120 may have any number (including none) of any of these devices.

Devices within business location 102 and/or residential location 120 may be connected via wired connections (e.g., coaxial cables, Telecommunications Industry Association category 5 ("cat 5") cables, etc.) and/or wireless connections (e.g., using network devices such as those available under the IEEE 802.11 wireless LAN standards).

Enterprise gateway 104 may include any network device that can connect network 110 to business network 106. Enterprise gateway 104 may include one or more server devices that may operate to enable VoIP communications and allow IP traffic between network 110 and business network 106.

Business network 106 may include any network device that can forward data packets between computer networks in a business environment. Business network 106 may include a VoIP enabled Private Branch Exchange (PBX), which may support multiple phone numbers. For example, a business may use a PBX to route VoIP calls to a number of telephone devices 126.

Wireless router 122 may include any network device that can forward data packets between computer networks. Wireless router 122 can be a router, modem, bridge, hub, or other type of network device that acts as a wireless access point.

Computer 124 may include, for example, a personal computer, such as desktop, laptop computer, Personal Digital Assistant (PDA), etc., used for general computing tasks.

Telephone device 126 may include a VoIP telephone that connect directly to a customer location's network (e.g., wireless router 122) or standard telephones that connect, through an adapter, to the customer location's network. Telephone device 126 may include standard analog phones or VoIP phones. As a VoIP phone, telephone device 126 may be a stand-alone telephone capable of initiating VoIP calls over network 110 or a "soft-phone" that is implemented as software on computing device 124 OR STB 127.

STB 127 may include a device that receives television programming, and provides the television programming to television 129 or another device. STB 127 may allow a user to alter the programming provided to television 129 based on a signal (e.g., a channel up or channel down signal) from remote control 130. STB 127 may record video in a digital format to a disk drive or other memory medium within STB 127. In one example implementation, STB 127 may be incorporated directly within television 129 and/or may include a digital video recorder (DVR).

Television 129 may include a television monitor that is capable of displaying television programming, content provided by STB 127, and/or content provided by other devices (e.g., a Digital Video Disk (DVD) player, an Internet-streaming device, a video camera, etc., not shown) connected to television 129.

In the example shown in FIG. 1A, STB 127 is shown with television 129. STB 127 may be used to control the content shown on television 129. STB 127 may include other applications, such as a "place telephone call" application, through which a user can initiate a telephone call with another party. The place telephone call application may initiate the call on behalf of the user and may result in a call placed to the called party and to the user's designated telephone, such as telephone device 126. From the user's perspective, the place telephone call application may be desirable as it may provide a convenient interface for placing a telephone call. Additionally, or alternatively, a computer 124 or telephone device 126 can be used to place a telephone call using a VoIP network through wireless router 122.

VoIP network 130 may include provider infrastructure for enabling VoIP services. VoIP network 130 may be implemented by, for example, a telecommunications company or another entity. Although shown as a separate network in FIG. 1A, in some implementations, the devices of VoIP network 130 may implemented as devices in network 110.

VoIP network 130 may include network elements or devices used to enable VoIP communications. VoIP network 130 may include VoIP gateway 132, an interface server 134, a logging server 136, and a traffic management system 138.

VoIP gateway 132 may include devices that operate to convert telephony traffic to IP traffic (and vice versa). VoIP gateway 132 may connect, for example, to one or more telephone networks. By converting between IP and telephony traffic, VoIP gateway 132 may allow calls to be received and placed on the telephony network. VoIP gateway 132 may perform additional functions, such as handling signaling and control messages used to control a VoIP session.

Interface server 134 may include one or more computing or network devices through which consumer devices, such as STB 127, may connect. For example, interface server 134 may include one or more of an application server, a session border controller, a network server, a route server, a media server, a web server, etc. In one implementation, interface server 134 may be a web server and STB 127 may communicate with interface server 134 using, for example, messages sent via the Hyper-Text Transfer Protocol (HTTP), Extensible Markup Language (XML), the Simple Object Access Protocol (SOAP) protocol, and/or may be provided in the original format or in an alternative format, such as a configurable format that can be optimized for specific uses. For example, one format can be a Traffic Detailed Record V2 (TDRV2), which can be designed to specifically handle VoIP volume. STB 127 may use interface server 134 as the primary interface through which STB 127 obtains data to implement network functions. For example, STB 127 may obtain weather data from interface server 134 to implement a weather widget. STB 127 may also implement the place telephone call application, through which STB 127 may place a telephone call to a called party. For this application, STB 127 may initiate the call by contacting interface server 134, which may contact VoIP gateway 132 to initiate the call. Devices other than STB 127, such as other consumer devices, may alternatively or additionally place calls by connecting to interface server 134.

Logging server 136 may include one or more server devices to log transactions with interface server 134 and/or VoIP gateway 132. Logging server 136 may store, for example, call requests placed through interface server 134. Logging server 136 may additionally log other information, such as status or presence information relating to users or other devices connected via network 110.

Traffic management system 138 may include devices to monitor and manage the traffic over VoIP network 130, as well as to communicate with NOC 140 and/or GNO 150. Traffic management system 138 may include one or more server devices. In one implementation, traffic management system 138 can monitor VoIP network 130, analyze issues and/or problems that may occur in VoIP network 130, and report the issues and/or problems to NOC 140 and/or GNO 150.

NOC 140 may include one or more server devices in one or more locations that can monitor and resolve issues with one or more networks, such as network 110 and/or VoIP network 130. NOC 140 can also monitor tickets and can take corrective actions based upon tickets. For example, NOC 140 can communicate with site technicians or find and resolve issues impacting networks as requested by the tickets.

GNO 150 may include one or more server devices in one or more locations that can analyze and find patterns from information provided by one or more NOC 140, or one or portions of devices that provide information to NOC (e.g., traffic management system 138). GNO 150 can proactively recognize customer-impacting problems by analyzing and finding patterns that may occur over one or more networks. For example, GNO 150 can be provided with network information from NOC 140 and other network operations centers, and GNO 150 can analyze the network information to find issues or particular patterns that are global in addition to individual network based.

Figure 1B:
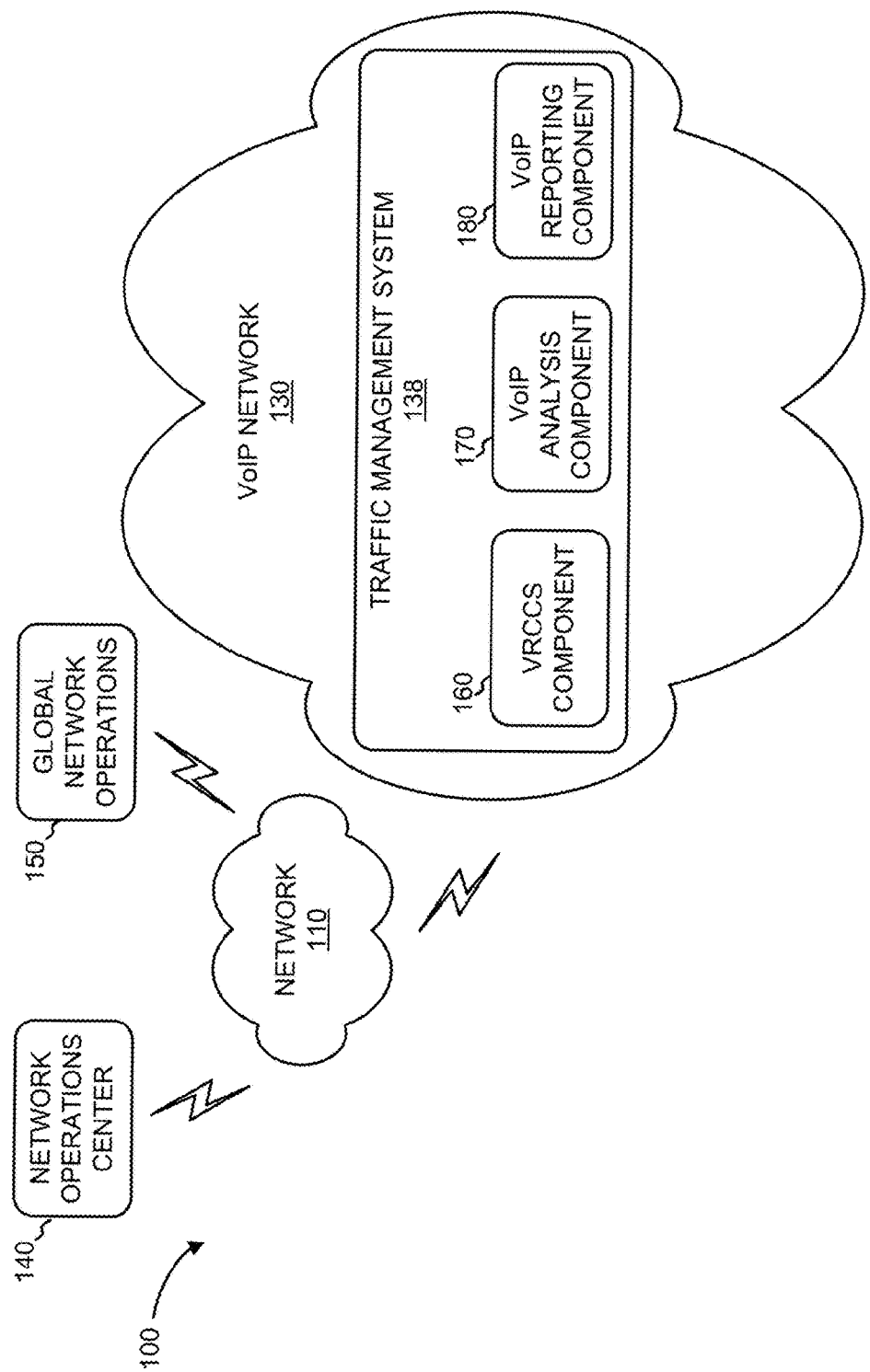
FIG. 1B is a diagram of an example environment in which systems and/or methods, described herein, may be implemented.

FIG. 1B illustrates traffic management system 138, which may include one or more devices, such as VoIP Record Collection, Correlation, and Standardization (VRCCS) component 160, VoIP analysis component 170, and VoIP reporting component 180, in communication with NOC 140 and GNO 150 via network 110.

Traffic management system 138 can include: VRCCS component 160 for record (e.g., data) collecting, correlation, and standardization from VoIP network 130; VoIP analysis component 170 for analyzing signaling data and timing data, creating alarms and reports on operational problems, and reporting alarms and operational problems to VoIP reporting component 180; and VoIP reporting component 180 for creating tickets for forwarding to NOC 140 and/or GNO 150. Any two or more components may be integrated into a single device. For example, VoIP analysis component 170 can be integrated with VoIP reporting component 180 to consolidate a view of voice and VoIP traffic into a single device. Alternatively, or additionally, any component can be a separate device. For example, VoIP analysis component 170 can be integrated with VoIP reporting component 180 into one device, and VRCCS component 160 can be a separate device.

Traffic management system 138 may be in communication with NOC 140. In one implementation, NOC 140 can take corrective action to fix problems discovered by VRCCS component 160, analyzed by VoIP analysis component 170, and/or reported by VoIP reporting component 180. For example, if VRCCS component 160 discovers a problem with the VoIP, VRCCS component 160 can report the problem to VoIP analysis component 170, VoIP analysis component 170 can prepare analysis and report the analysis along with an alarm to VoIP reporting component 180, and VoIP reporting component 180 can create a ticket requesting corrective action for the problem from NOC 140.

Traffic management system 138 may be in communication with GNO 150. In one implementation, GNO 150 can be provided with information from traffic management system 138, and can proactively recognize customer-impacting problems, and also research call failures and failure patterns from this information from traffic management system 138. GNO 150 can use this information to resolve problems and improve network performance, and thus increase the QoS for the VoIP users.

Although FIGS. 1A-1B illustrate example components of example environment 100, in other implementations, environment 100 may include additional components, fewer components, different components, or differently arranged components than those illustrated in FIGS. 1A-1B and described herein. Alternatively, or additionally, one or more of the components shown in FIGS. 1A-1B may perform functions described as being performed by other of the components shown in FIGS. 1A-1B.

FIG. 2 is a diagram of example components of a device 200 that may correspond to one of the devices of environment 100. Device 200 may be included in, for example, wireless router 122, computer 124, telephone device 126, STB 127, television 129, VoIP gateway 132, interface server 134, logging server 136, traffic management system 138 including VRCCS component 160, VoIP analysis component 170, and/or or VoIP reporting component 180, network operations center 140, and/or global network operations 150. As illustrated, device 200 may include a bus 210, a processor 220, a memory 230, an input component 240, an output component 250, and a communication interface 260.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 320, and/or any type of non-volatile storage device that may store information for use by processor 220.

Input component 240 may include a mechanism that permits a user to input information to device 200, such as a keyboard, a keypad, a button, a switch, a microphone, a touch screen, etc. Output component 250 may include a mechanism that outputs information to the user, such as a display, a speaker, one or more Light Emitting Diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 110. In one alternative implementation, communication interface 360 may be a logical component that includes input and output ports, input and output systems, and/or other input and output components that facilitate the transmission of data to other devices.

Device 200 may perform certain operations associated with environment 100. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3A:
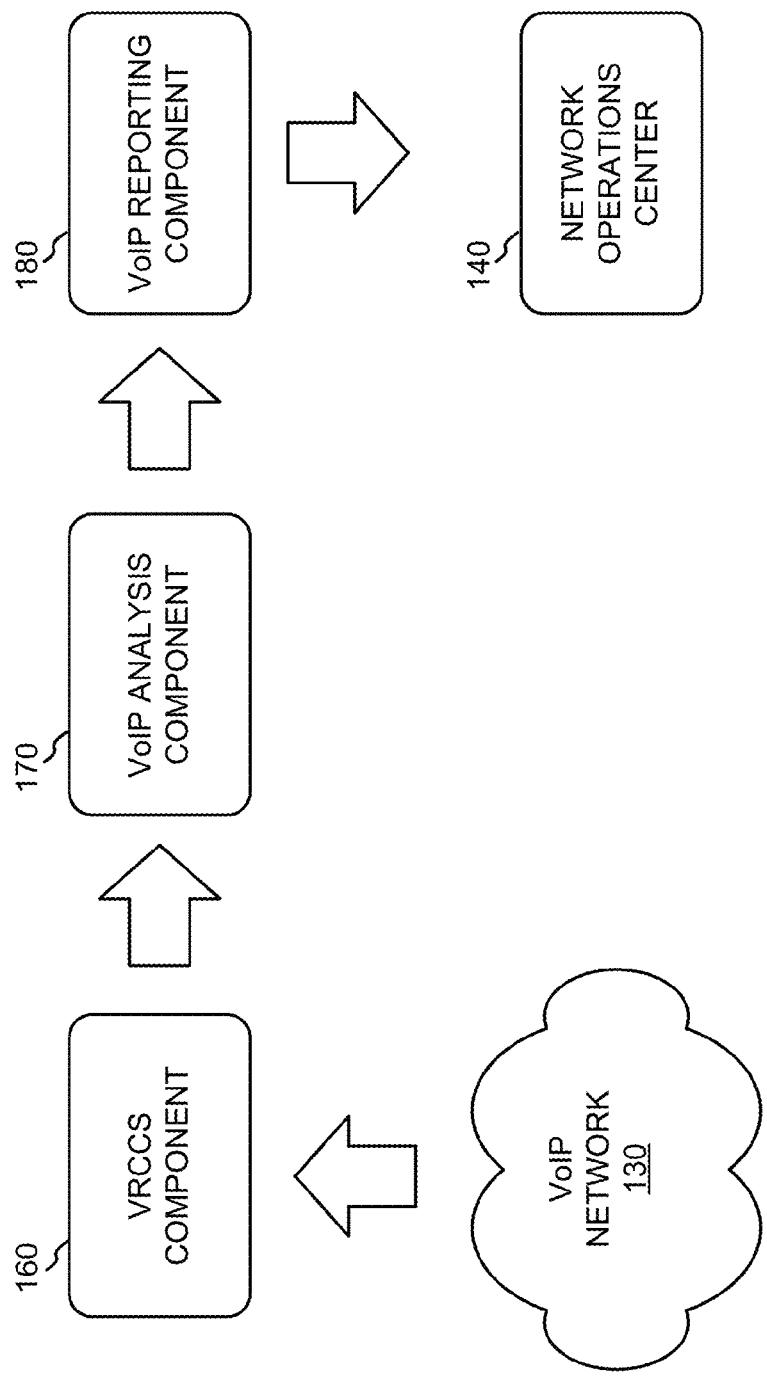
FIG. 3A is a flow diagram of an example traffic management system, described herein.

FIG. 3A illustrates a flow diagram from devices in traffic management system 138 to NOC 140. As illustrated, signals from VoIP gateway 132 can be monitored by VRCCS component 160 to find issues and/or problems that may occur in VoIP network 130.

In one implementation, VRCCS component 160 can include one or more server devices, such as Internet Protocol Traffic Systems (IPTS) or other systems that can be used for records collection, summarization, and standardization from VoIP network 130. VRCCS component 160 may collect records (e.g., data) from one or more network elements, summarize the records (e.g., create Operation Measurements (OMs)), and standardize the format for the records (e.g., place records into a particular format, such as maintenance Call Data Records (mCDRs)) from VoIP network equipment and/or Internet Protocol Interactive Voice Response (IP/IVR) systems.

VRCCS component 160 can collect data by polling signaling records from VoIP network 130 to identify problems with VoIP network 130 using OMs. OMs can be created by VRCCS component 160 from VoIP signaling records. OMs can be available at near real time (e.g., within 5 minutes, within 10 minutes, within 1 minute, etc.) and can be available in a variety of time frames (e.g., 5 minute intervals, 30 minute intervals, daily intervals, weekly intervals, etc.).

Data points of OMs can contain information on traffic between a pair of signaling elements (e.g., a requester and a responder), and the OMs can be sent to VoIP analysis component 170 for analysis. For example, information on traffic can include source or destination elements, event methods (e.g., REGISTER, SUBSCRIBE, INVITE, etc.), quantity of messages sent by requester, and/or quantity of messages sent by responder.

In one implementation, VRCCS component 160 can monitor a Session Border Controller (SBC), an internal server, an external server, or other VoIP network equipment that can provide data.

In one implementation, data driving VRCCS component 160 can be gathered when certain events occur. For example, data can be gathered when sessions begin, such as when Session Initiation Protocol (SIP) methods occur. In one implementation, data can be gathered for VRCCS component 160 when certain actions over a measure of time occur. For example, SIP methods, such as INVITE or error responses per INVITE can be used with a threshold period of time (e.g., 1 minute intervals) per measure of time to trigger an alarm indicating that data can be gathered.

Additionally, data driving VoIP analysis component 170 can be set to not be gathered if there are errors, if a session has not been initiated, and/or if a false alarm is being triggered. In one implementation, data driving VoIP analysis component 170 can be set to account for errors, lack of response to a session initiation, and/or false alarms. For example, an origin and destination can be tagged with a counter and any error response, lack of response, or particular threshold (e.g., the quantity of the counter) for response can set off an alarm indicating that data should not be gathered. For example, a threshold can be set to account for a time of day, a day of the week, and/or other factors to allow for busy or slow periods without creating false alarms, and/or thresholds can be able to detect when signaling from an element stops entirely.

VRCCS component 160 can also create call records for calls. In one implementation, a single call record can be created for each call. For example, each call can be assigned a unique call identifier, which can be propagated across network elements to have one record per call. By creating single call records per call, VoIP problems may be quicker to diagnose and repair.

The records standardized by VRCCS component 160 as mCDRs. The mCDRs can be based upon network events (e.g., registering a device, subscribing to a VoIP service, etc). The mCDRs can provide components in a call, such as calling and/or called numbers, answer time, signaling elements, response codes, etc. A mCDR can be produced for failing and/or successful calls. One mCDR may be created per call and/or calls exceeding a threshold (e.g., calls exceeding 30, 60, 90, etc. minutes in duration) may produce multiple mCDRs.

The mCDRs can include data in a predefined format that can be used for VoIP calls. In one implementation, each VoIP call may create data that can be kept in a mCDR format for comparison to other mCDRs across the VoIP network 130. For example, present and future VoIP platforms for VoIP networks, such as VoIP network 130, can be configured to utilize and present mCDR data with standard mCDR fields.

VoIP analysis component 170 can also monitor devices or signals external of VoIP network 130 for signals or actions that may cause issues and/or problems for VoIP network 130. For example, VoIP analysis component 170 may monitor telephone (e.g., non-VoIP) domestic networks through a Local Access and Transport Area (LATA) rate center or a tandem rate center, or PSTN international networks, such as through a country/carrier or a country/serving area.

VoIP analysis component 170 can include one or more server devices, such as International Community Information Systems (ICIS), Signaling Circuit Correlation Presentation (SciCop), International Community Information System Web (ICIS Web) systems, Global Call Search (GCS) systems, or other server devices that can be used for data analysis. In one implementation, VoIP analysis component 170 can analyze data from VRCCS component 160, such as the signaling and timing data, OMs, mCDR, etc., and VoIP analysis component 170 can create reports and alarms based on this analysis.

VoIP analysis component 170 can analyze data based upon an automated algorithm provided to VoIP analysis component 170 by NOC 140, or NOC 140 can define alarm rules and/or thresholds for VoIP analysis component 170 to utilize for analysis. For example, VoIP analysis component 170 create reports on operational problems based upon analyzing the data from VRCCS component 160 using automated algorithms. Additionally, or alternatively, NOC 140 can define an alarm rule that VoIP analysis component 170 is to create an alarm when a particular circumstance occurs, such as more operational problems over an hour than a threshold quantity.

VoIP analysis component 170 can monitor changes in VoIP messaging patterns using OMs based on time. For example, VoIP analysis component 170 can monitor changes on a time of day basis, or a day of the week basis. Additionally, or alternatively, VoIP analysis component 170 can monitor changes in VoIP messaging patterns on a device-to-device level, a device-to-product level, a device-to-enterprise customer level, and/or a network-to-network level. VoIP analysis component 170 may also be able to create a statistical record based upon these monitoring of changes.

VoIP analysis component 170 can also poll timing information for VoIP network 130 to identify problems with VoIP network 130. For example, VoIP analysis component 170 can monitor changes in event messaging patterns by time of day to create a statistical report on call attempts, network efficiency, hold times, etc.

VoIP analysis component 170 can monitor changes in calling patterns using mCDR based on time. Changes in calling patterns can include monitoring patterns, such as call attempts, answer supervision, network efficiency rating, mean holding time, etc. VoIP analysis component 170 can monitor changes in calling patterns based on time, such as a time of day, or a day of the week.

VoIP analysis component 170 can monitor key voice traffic performance indicators using OMs and/or mCDR. One example VoIP analysis component 170 can be ICIS. ICIS can be used to analyze call attempts, network efficiency rating, and/or average call duration. ICIS can use the analysis to create alarms indicating that call attempts, for example, are causing VoIP traffic problems. For example, VoIP analysis component 170 can create an alarm to send to VoIP reporting component 180 based on analysis of data regarding call attempts by following rules provided by NOC 140 to determine if an aspect of call attempts found in the data (e.g., the volume, time between call attempts, etc.) satisfies a rule provided by NOC 140 to create an alarm.

Another example VoIP analysis component 170 can be SciCop and/or ICIS Web. SciCop can be used to analyze call blockages and/or call failures. ICIS Web can be used to provide next day reporting. Similar to ICIS, SciCop and/or ICIS Web can also follow rules set forth by NOC 140 to determine whether to create an alarm to send to VoIP reporting component 180.

VoIP analysis component 170 can signal VoIP reporting component 180 when issues and/or problems are detected and/or identified. The detected and/or identified issues and/or problems can include information contained within the mCDRs from VoIP analysis component 170. The detected and/or identified issues and/or problems can be analyzed by VoIP reporting component 180, and VoIP reporting component 180 can prepare a report on operational issues and/or problems with VoIP network 130.

VoIP analysis component 170 can send any operational issues and/or problems information to VoIP reporting component 180. VoIP reporting component 180 can take create alarms or tickets for action to send to NOC 140.

VoIP reporting component 180 can include one or more server devices, such as Integrated Management Platform for Advanced Communication Technologies (IMPACT) systems or other systems that can be used for VoIP traffic correction or traffic data presentation. In one implementation, VoIP reporting component 180 can include one or more server devices that can create a ticket to send to NOC 140.

VoIP reporting component 180 can use NOC 140 defined ticketing rules to determine whether VoIP reporting component 180 should create and send a ticket to NOC 140. NOC 140 can provide rules for VoIP reporting component 180 to determine when tickets should be created and sent. In one implementation, tickets can be created with threshold monitoring levels that can be set by device type, response code, or other ticket rule criteria for determining when to create and send tickets.

For example, if VRCCS component 160 discovers a problem with VoIP network 130, VRCCS component 160 can report the problem to VoIP analysis component 170, and VoIP analysis component 170 can prepare an analysis and report the analysis and/or an alarm to VoIP reporting component 180. VoIP reporting component 180 can create a ticket requesting service for the problem and can send the ticket to NOC 140.

In one implementation, VoIP reporting component 180 can also send commands to one or more VoIP network elements, rather than (or in addition) to NOC 140, to take corrective action on issues and/or problems in one or more of the same, different, or a combination of the same and different VoIP network elements. For example, VoIP network 130 may have a correctable error occur in a VoIP network element, such as interface server 134. VoIP reporting component 180 may send a command to interface server 134, rather than to NOC 140, to correct the error.

Figure 3B:
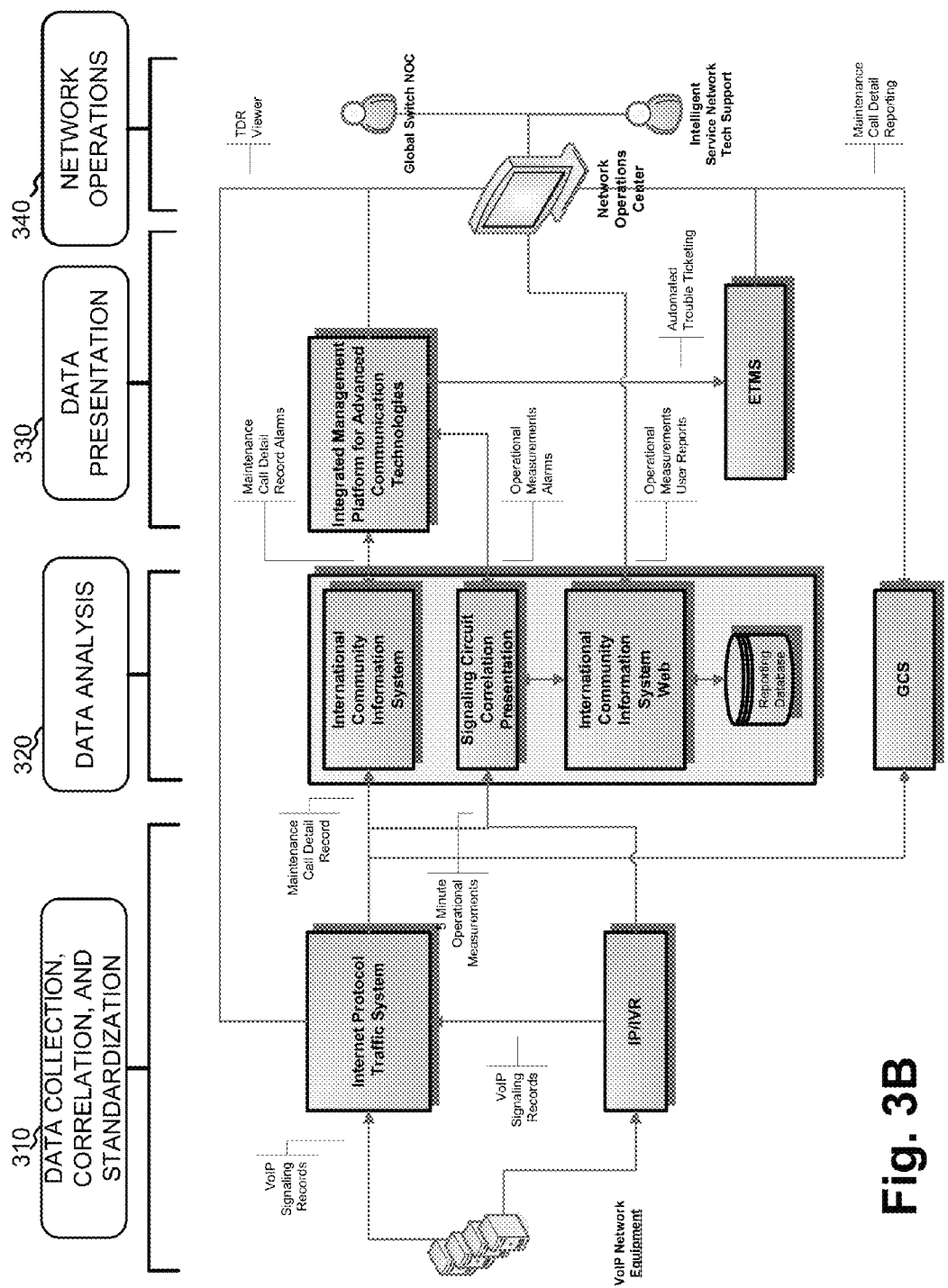
FIG. 3B is an example traffic management system, described herein.

FIG. 3B is an example traffic management system with one or more example server devices illustrated, as described with respect to FIG. 3A. Assume that the traffic management system includes the functional components of: data collection 310, data analysis 320, data presentation 330, and network operations 340. For example, data collection 310 can be done by a VRCCS component 160, such as IPTS, which may collect data from IP/IVR and/or VoIP network equipment. Data collection 310 can send mCDRs or mCDR to data analysis 320. Data analysis 320 can be done by VoIP analysis component 170, such as ICIS, SciCop, ICIS Web, and/or GCS. Data analysis 320 can send mCDR alarms, OMs alarms, OMs user reports, etc. to data presentation 330. Data presentation 330 can be done by VoIP reporting component 180, such as an alarming platform (e.g., IMPACT), and the alarming platform can send alarms to an Enterprise Trouble Management System (ETMS), which can create automated trouble ticketing. Tickets from data presentation 330 can be sent to network operations 340. Network operations 340 can be done by NOC 140, a Global Switch NOC, and/or Intelligent Service Network Tech Support, which can act on the tickets to resolve problems occurring in the VoIP network and can access a Traffic Detailed Report (TDR) viewer for information.

Figure 4:
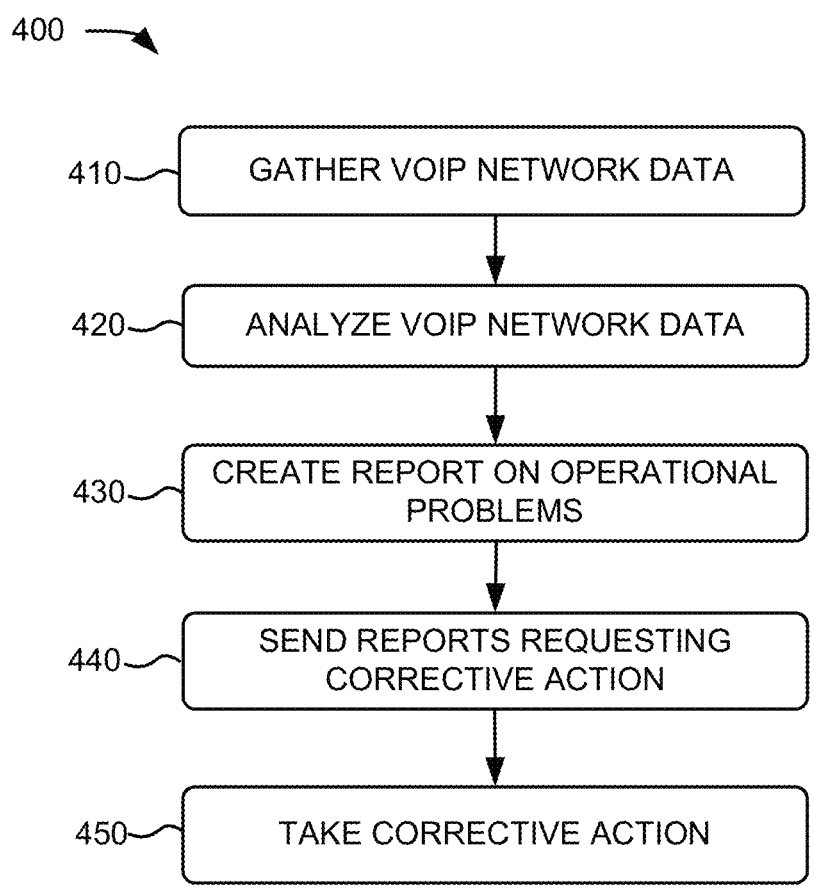
FIG. 4 is a flow chart of an example process for managing VoIP traffic according to an implementation described herein.

FIG. 4 is a flow chart of an example process 400 for managing VoIP traffic according to an implementation described herein. Process 400 may be performed by processor 220 of one or more devices, including one or more server devices of VRCCS component 160, VoIP analysis component 170, VoIP reporting component, NOC 140, and/or GNO 150. Process 400 may allow for issues and/or problems to be monitored, analyzed, corrected, and/or reported to NOC 140 to manage VoIP traffic and improve QoS for VoIP users.

Process 400 may include gathering VoIP network data (block 410). In one implementation, gathering VoIP network data can be done by VRCCS component 160 to collect, correlate, and standardize records in VoIP network 130, as further discussed with respect to FIG. 3A. For example, signaling data can include information on traffic from VoIP network 130, such as traffic between a pair of signaling elements, an event method, a response code, a quantity of messages sent by a requester, and/or a quantity of messages sent by a responder. OMs, which can provide messaging pattern information about VoIP network 130, can be created and gathered by VRCCS component 160 from signaling data. Additionally, mCDRs, which can provide calling pattern information about VoIP network 130, can be created and gathered by VRCCS component 160 from signaling data.

Process 400 may include analyzing VoIP network data (block 420). In one implementation, analyzing VoIP network data can be done by VoIP analysis component 170 to analyze issues and/or problems in VoIP network 130, as further discussed with respect to FIG. 3A. For example, VoIP analysis component 170 can analyze data, such as the signaling and timing data, OMs, mCDR, etc., and VoIP analysis component 170 can create reports and/or alarms based on this analysis. Reports can be generated based on analyzing signaling data, timing data, operational problems, etc.

Process 400 may include creating reports on operational problems (block 430). In one implementation, creating reports can be done by VoIP analysis component 170 from the analysis performed on the data, as further discussed with respect to FIG. 3A. For example, VoIP analysis component 170 can create a report on OMs or mCDR data based upon analysis performed by VoIP analysis component 170.

Figure 5:
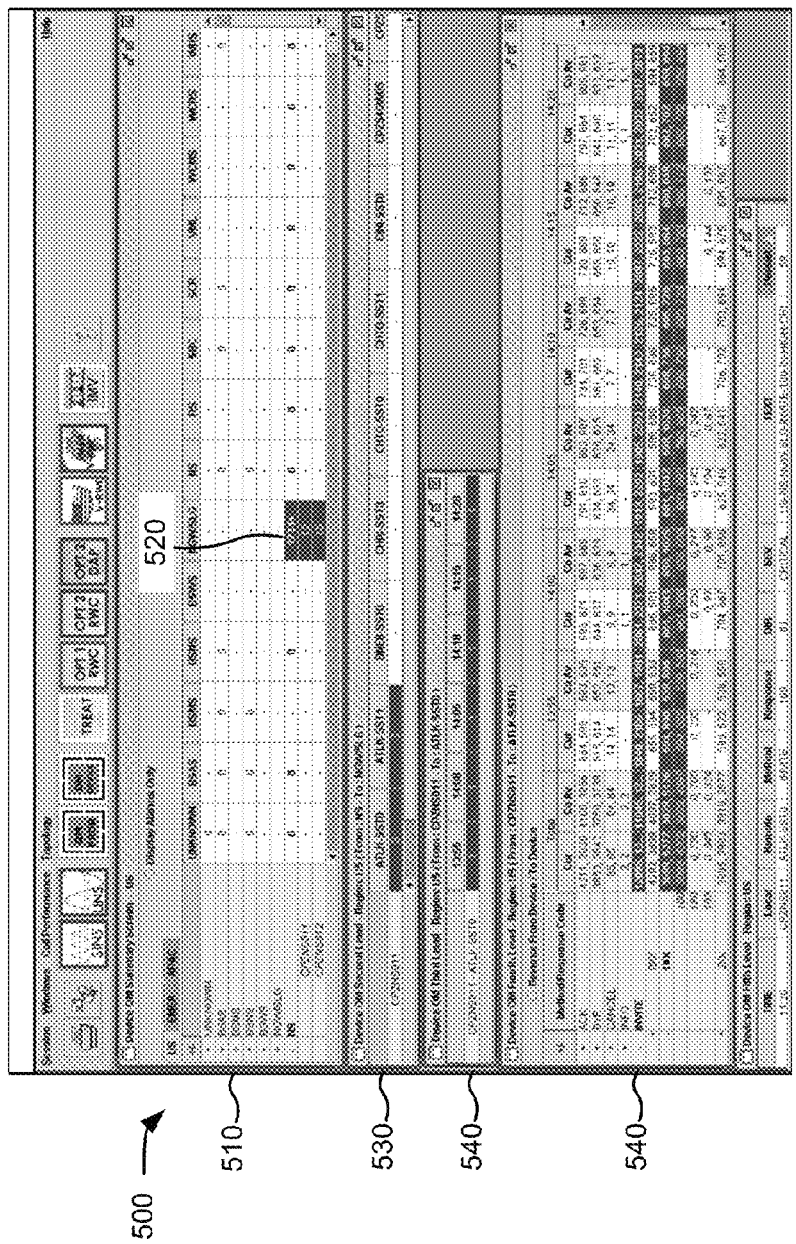
FIGS. 5 and 6 are diagrams of example user interfaces illustrating reports according to implementations described herein.

FIG. 5 is an illustration of an example user interface 500 displaying a report that can be prepared based upon OM data. As illustrated in FIG. 5, a first section 510 can display a network summary of problems and can provide alarm indications 520 for SIP responses between device types. These alarm indications 520 can provide information on an individual device level (e.g., each type and device can be represented on the vertical and horizontal line).

A second section 530, a third section 540, and a fourth section 540 illustrate additional information that can be provided to alarm indications 520. By providing the second section 530, the third section 540, and the fourth section 550, more granularity as to the exact errors and the specific devices experiencing them in a reflexive relationship can be observed.

Figure 6:
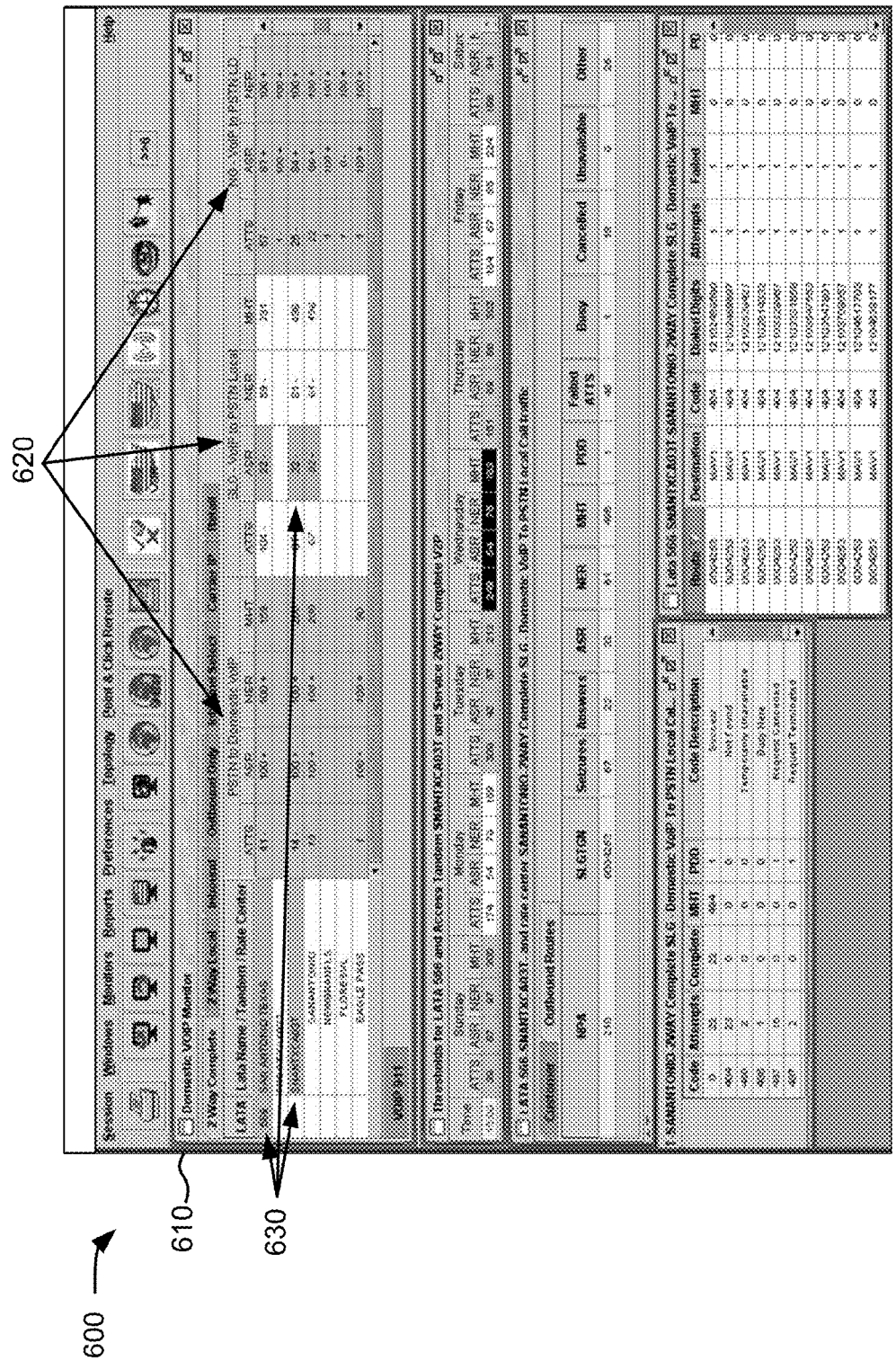

FIG. 6 is an illustration of a user interface 600 displaying a report 610 on call statistics for calling areas in three areas 620, PSTN to the VoIP platform, Shared Local Gateways (SLG) on VoIP to the local PSTN, and the Next Generation (NG) VoIP platform to Long Distance (LD) PSTN. Problem indications 630 are illustrated and can be drilled into for more detailed information. This particular user interface 600 can be used to analyze local calls, inbound calls, carrier IP level calls, retail customer level, and several other VoIP customer types.

Returning to FIG. 4, process 400 may include sending reports requesting corrective action (block 440). In one implementation, VoIP analysis component 170 can send reports requesting corrective action to VoIP reporting component 180. VoIP analysis component 170 can determine whether to send reports requesting corrective action based upon NOC-defined alarm rules. For example, VoIP analysis component 170 can identify an increase in messages above a historic norm for a customer, as defined by NOC-defined alarm rules, and VoIP analysis component can prepare and send reports accordingly.

Process 400 may include taking corrective action (block 450). In one implementation, VoIP reporting component 180 may take corrective action based upon a report from VoIP analysis component 170. For example, VoIP analysis component 170 can send a report requesting corrective action based upon a problem found by VRCCS component 160, and VoIP reporting component 180 can take corrective action, such as by creating and sending a ticket to NOC 140 to request attention. VoIP reporting component 180 can determine whether to create and send a ticket to NOC 140 based upon NOC-defined ticketing rules. For example, VoIP reporting component 180 can create and send a ticket to NOC 140 when a quantity of alarms in a report exceeds a particular value.

Figure 7:
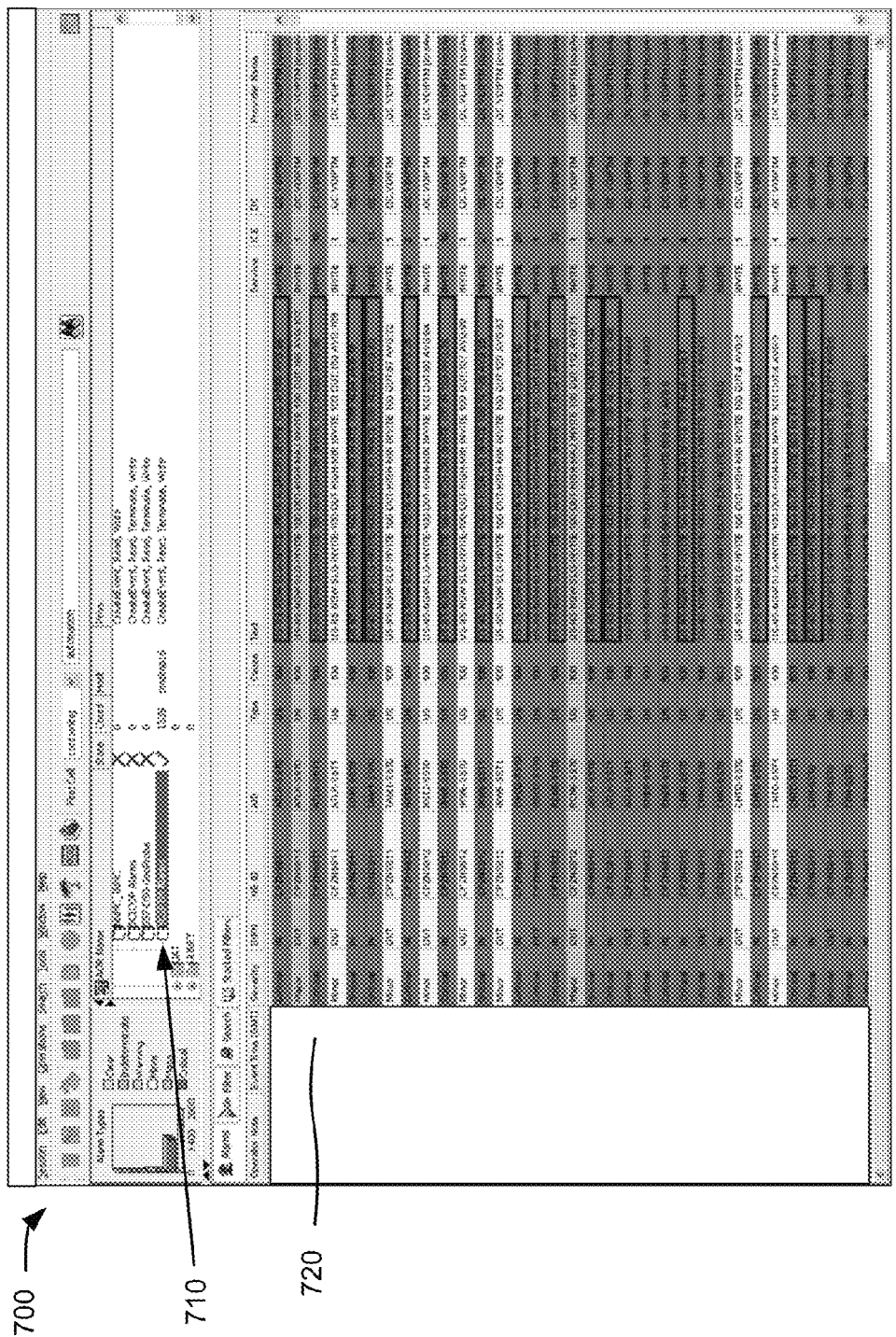
FIG. 7 is a diagram of an example user interface illustrating alarms based upon Network Operations Center (NOC) defined ticketing rules according to an implementation described herein.

FIG. 7 is a diagram of an example user interface 700 illustrating alarms based upon NOC-defined ticketing rules according to an implementation described herein. As illustrated in FIG. 7, alarms, such as critical, major, and minor severity alarms can be reported. These alarms have been delivered by IMPACT from the Traffic Management System with an Area of Responsibility (AOR) 710, which contains alarms 720 from the Traffic Management System to be displayed here for action by a user, or for information only.

Figure 8:
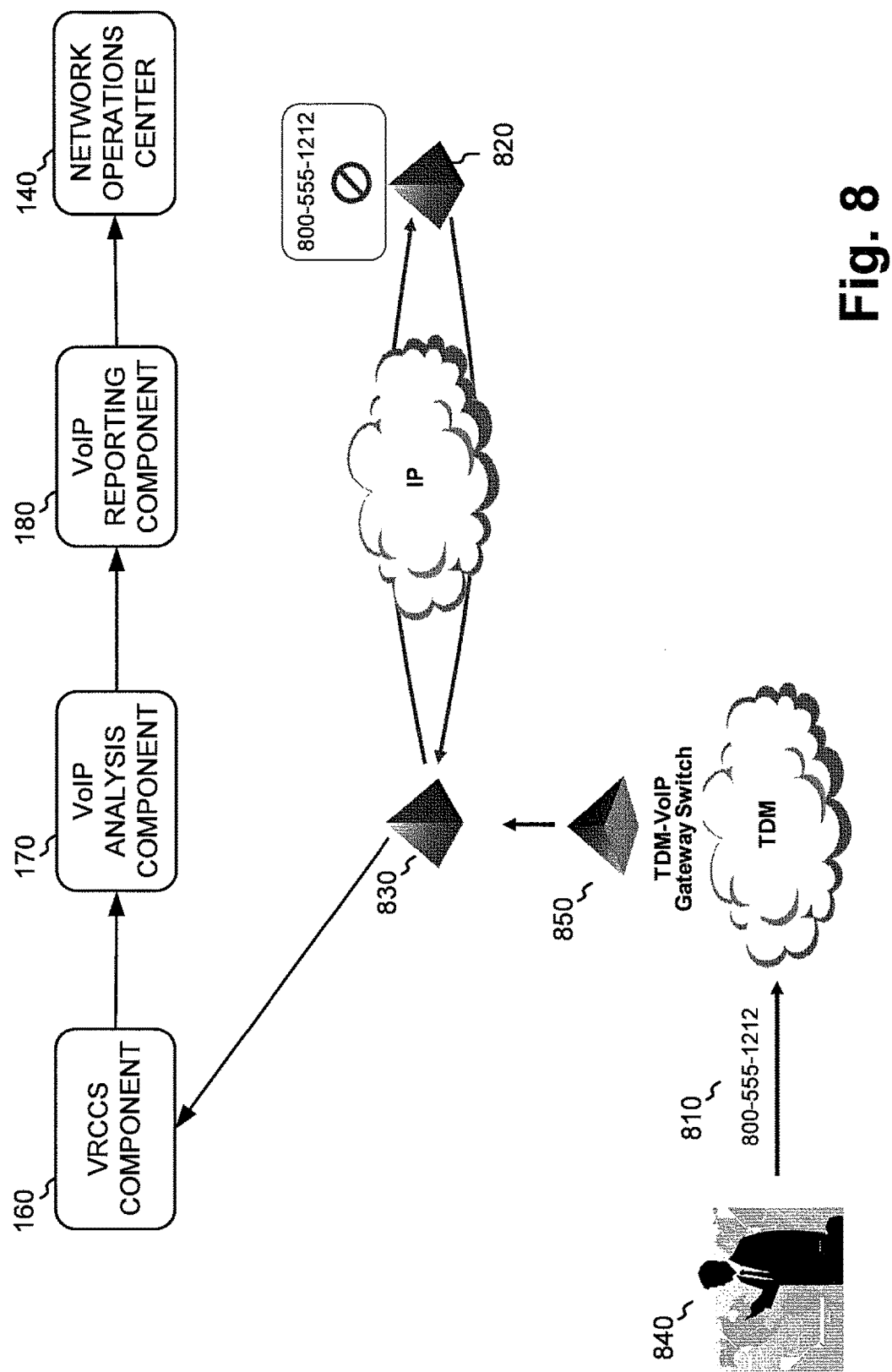
FIGS. 8-10 are diagrams of example use cases of implementations described herein.

FIG. 8 is a diagram of an example use case of an implementation described herein. In FIG. 8, a terminating route looping problem is illustrated. A terminating route looping problem can include situations when telephone calls are misrouted to incorrect or unconnected locations based on a telephone number. For example, as illustrated in FIG. 8, a customer orders new VoIP service or ports an existing telephone number 810 (e.g., 800-555-1212) to a VoIP service, and the customer's equipment 820 is configured to route by default to a VoIP server 830. If the customer fails to configure the new or ported telephone number properly, then the customer equipment 820 and VoIP server 830 can have a terminating route looping scenario. In other words, a caller 840 can dial the existing telephone number 810, be routed through a telephone switch 850 (e.g., TDM and TDM-VoIP gateway switch), but not be able to connect to customer's equipment 820 due to a terminating route loop problem between the customer equipment 820 and VoIP server 830, which does not allow a call to the new or ported telephone number 810 to be properly routed by VoIP server 830.

In this example use case, VoIP analysis component 170 can monitor VoIP server 830 and can observe an increase in traffic between VoIP server 830 and customer's equipment 820 above a historic norm for the customer (or similar customers). VoIP analysis component 170 can send a report to VoIP reporting component 180 reporting the terminating route looping problem, and VoIP reporting component 180 can attempt to correct the problem. For example, if the problem is a misrouting error in VoIP network 130 that can be re-routed by VoIP reporting component 180, then VoIP reporting component 130 can correct the problem. If the problem cannot be corrected by VoIP reporting component 180, then VoIP reporting component 180 can create and send a ticket to NOC 140 for further corrective action. This example use case can allow for automated ticketing under NOC 140 control. The effectiveness of traffic management system 138 can be measured by the quantity of alarms generated by VoIP analysis component 170 or quantity of tickets generated by VoIP reporting component 180.

Figure 9:
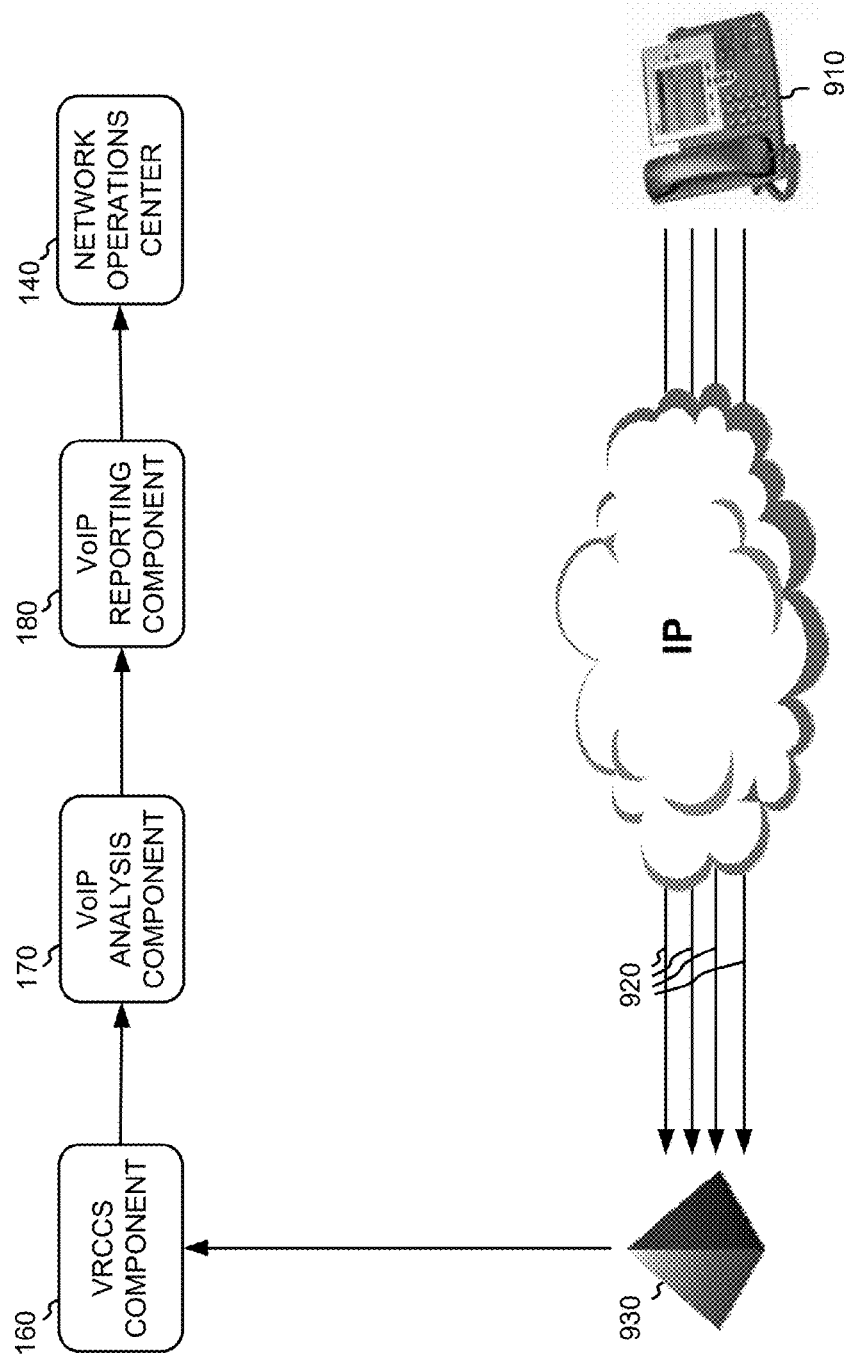

FIG. 9 is a diagram of another example use case of an implementation described herein. In FIG. 9, a registration storm problem is illustrated. A registration storm problem can include customer mis-configuration of a registration that can cause VoIP telephones to re-register at shorter time intervals (e.g., every 60 seconds) than the usual time intervals (e.g., every 60 minutes) causing system overload. For example, as illustrated in FIG. 9, a customer's equipment 910 can send a registration request 920 to a VoIP server 930 at shorter time intervals than preset time intervals or historic norms for the customer.

In this example use case, VoIP analysis component 170 can monitor VoIP server 930 and can observe an increase in registration requests 920 from the customer's equipment 910 to VoIP server 930 above a historic norm for the customer (e.g., every 60 minutes). VoIP analysis component 170 can send a report to VoIP reporting component 180 reporting the registration storm problem, and VoIP reporting component 180 can attempt to correct the problem. For example, the problem could be a reporting error within VoIP network 130 that VoIP reporting component 180 could correct. If the problem cannot be corrected by VoIP reporting component 180, then VoIP reporting component 180 can create and send a ticket to NOC 140 for further corrective action. This example use case can allow for automated ticketing under NOC 140 control. The effectiveness of traffic management system 138 can be measured by the quantity of alarms generated by VoIP analysis component 170 or quantity of tickets generated by VoIP reporting component 180.

Figure 10:
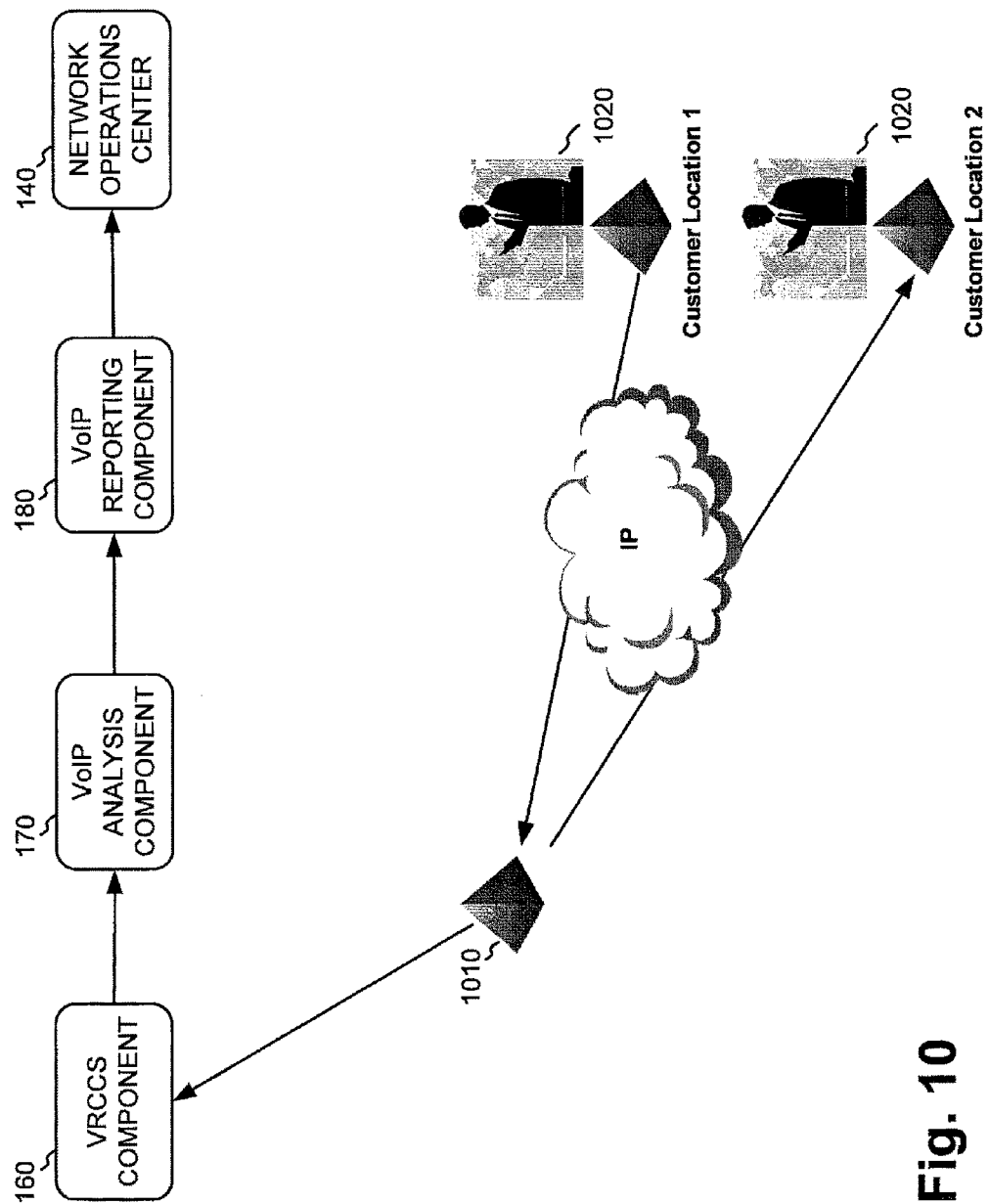

FIG. 10 is a diagram of another example use case of an implementation described herein. In FIG. 10, a call quality traffic problem is illustrated. A call quality traffic problem can include irregularly high traffic due to customers hanging up and re-dialing for a better connection.

In this example use case, VoIP analysis component 170 can monitor VoIP server 1010 and can observe a decrease in customer Mean Holding Time below historic norms (e.g., callers are hanging up and re-dialing rather than holding a conversation) from customer locations 1020. VoIP analysis component 170 can send a report to VoIP reporting component 180 reporting the call quality traffic problem, and VoIP reporting component 180 can attempt to correct the problem. For example, if the problem is a call quality problem that can be corrected by VoIP reporting component 180, then the problem can be corrected. If the problem cannot be corrected by VoIP reporting component 180, then VoIP reporting component 180 can create and send a ticket to NOC 140 for further corrective action. This example use case can allow for automated ticketing under NOC 140 control. The effectiveness of traffic management system 138 can be measured by the quantity of alarms generated by VoIP analysis component 170 or quantity of tickets generated by VoIP reporting component 180.

A system and/or a method described herein may provide an automated alarm or ticket based on automatically collected and analyzed data. The data can be automatically collected, correlated, and standardized using a data collection component. The data can be automatically analyzed using a data analysis component. The data can be analyzed by comparing the gathered VoIP traffic data to preset or historic VoIP traffic data according to rules set forth by the external device or user, such as a NOC. The results of the analysis and/or an alarm can be sent to a data reporting component that can create a ticket based on rules provided by the external device or user to create a ticket regarding issues or problems occurring on a VoIP network.

The foregoing description provides illustration and description, but is not intended to be exhaustive or to limit the implementations to the precise form disclosed. Modifications and variations are possible in light of the above disclosure or may be acquired from practice of the implementations.

While a series of blocks has been described with regard to FIG. 4, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor and executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by one or more server devices, voice over Internet protocol (VoIP) traffic management rules from a network operations center;
   gathering, by the one or more server devices, VoIP traffic data from a VoIP network;
      gathering the VoIP traffic data including:
         polling signaling records from the VoIP network,
         monitoring changes in VoIP messaging patterns, and
         polling timing information,
   correlating, by the one or more server devices, the VoIP traffic data into summaries;
   standardizing, by the one or more server devices, the summaries into a predefined format;
   analyzing, by the one or more server devices and based on standardizing the summaries, the VoIP traffic data to identify a problem with the VoIP network;
   creating, by the one or more server devices and based on the VoIP traffic management rules and analyzing the VoIP traffic data, a ticket identifying the problem; and
   sending, by the one or more server devices, the ticket to the network operations center based on the VoIP traffic management rules.

2. The method of claim 1, where receiving the VoIP traffic management rules from the network operations center includes:
   receiving network operations center defined alarm rules and network operations center defined ticketing rules.

3. The method of claim 1, where gathering the VoIP traffic data further includes:
   automatically gathering a call record and an operational measurement (OM) of the VoIP traffic data for use with the VoIP traffic management rules.

4. The method of claim 3, where gathering the VoIP traffic data further includes:
   automatically gathering a call record for each call in the VoIP network, and gathering real time data.

5. The method of claim 3, where polling the signaling records includes:
   polling the signaling records using the OM to identify problems with the VoIP network, and
   where analyzing the VoIP traffic data includes:
      monitoring changes in calling patterns using records over time to identify the problem with the VoIP network.

6. The method of claim 1, where analyzing the VoIP traffic data includes:
   comparing the VoIP traffic data to at least one of:
      preset VoIP traffic data, or
      historic VoIP traffic data,
   where creating the ticket includes:
      creating the ticket based upon the VoIP traffic data exceeding a threshold level of the at least one of the preset VoIP traffic data or the historic VoIP traffic data, where the threshold level is set based on the VoIP traffic management rules.

7. The method of claim 1, where gathering the VoIP traffic data from the VoIP network further includes:
   gathering terminated route looping data, registration storm data, or poor VoIP quality data, and
   where creating the ticket includes:
      automatically creating a terminated route looping ticket, a registration storm ticket, or a poor VoIP quality ticket based on gathering the terminated route looping data, the registration storm data, or the poor VoIP quality data.

8. A voice over Internet protocol (VoIP) traffic management system comprising:
one or more server devices to:
receive VoIP traffic management rules from a network operations center;
gather VoIP traffic data from a VoIP network,
when gathering the VoIP traffic data, the one or more server devices being to:
poll signaling records from the VoIP network,
monitor changes in VoIP messaging patterns, and
poll timing information;
correlate the VoIP traffic data into summaries;
standardize the summaries into a predefined format;
analyze, based on standardizing the summaries, the VoIP traffic data with the VoIP traffic management rules to identify a VoIP traffic problem in the VoIP network;
create a ticket based on the identified VoIP traffic problem in the VoIP network; and
send the ticket to the network operations center.

9. The system of claim 8, where, when receiving the VoIP traffic management rules, the one or more server devices are to:
receive network operations center defined ticketing rules, and
where, when sending the ticket, the one or more server devices are to:
automatically send the ticket to the network operations center based on the network operations center defined ticketing rules.

10. The system of claim 8, where, when gathering the VoIP traffic data, the one or more server devices are further to:
automatically gather a record for each call, and
gather real time data.

11. The system of claim 8, where, when analyzing the signal VoIP traffic data, the one or more server devices are to:
monitor changes in calling patterns using the VoIP traffic data over time to identify the problem with the VoIP network.

12. The system of claim 8, where, when analyzing the VoIP traffic data, the one or more server devices are to:
compare the VoIP traffic data to one or more of:
preset VoIP traffic data, or
historic VoIP traffic data;
where, when creating the ticket, the one or more server devices are to:
create the ticket based upon the VoIP traffic data exceeding a threshold level of the one or more of the preset VoIP traffic data or the historic VoIP traffic data,
the threshold level being set based on the VoIP traffic management rules.

13. The system of claim 8, where, when gathering the data, the one or more server devices are further to:
gather the VoIP traffic data for terminated route looping data, registration storm data, or poor VoIP quality data, and
where, when creating the ticket, the one or more server devices are to:
create the automated ticket based on the VoIP traffic data for terminated route looping data, the registration storm data, or the poor VoIP quality data.

14. The system of claim 8, where the one or more server devices include one or more of:
a data collection component to collect the VoIP traffic data;
a data analysis component to analyze the VoIP traffic data and create alarms; or
a data reporting component to correct VoIP traffic or to present traffic data by creating and sending the ticket based on network operations center defined ticketing rules.

15. The system of claim 14, where the data collection component comprises an Internet protocol traffic system (IPTS) that collects, correlates, and standardizes the VoIP traffic data for the data analysis component,
where the IPTS collects VoIP traffic data by polling the signaling records from the VoIP network using operational measurements, by monitoring the changes in the VoIP messaging patterns using operational measurements based on time, and by polling the timing information to identify problems with the VoIP network,
where the IPTS correlates the VoIP traffic data into the summaries, and
where the IPTS standardizes the summaries into the predefined format,
the predefined format comprising a format that is usable, by the data analysis component, to analyze the VoIP traffic data.

16. The system of claim 14, where the data analysis component comprises at least one of:
an international community information system (ICIS) to analyze one or more of:
a call attempt,
a network efficiency rating, or
an average call duration,
a signaling circuit correlation presentation (SciCop) system that is used to analyze one or more of:
call blockages, or
call failures, or
an international community information system (ICIS) web system to provide next day reporting.

17. A non-transitory computer-readable medium storing instructions, the instructions comprising:
one or more instructions that, when executed by one or more processors of one or more server devices, cause the one or more processors to:
receive voice over Internet protocol (VoIP) traffic management rules;
gather VoIP traffic data associated with a VoIP network;
when the one or more instructions to gather the VoIP traffic data include:
one or more instructions that, when executed by the one or more processors, cause the one or more processors to:
poll signaling records from the VoIP network,
monitor changes in VoIP messaging patterns, and
poll timing information;
correlate the VoIP traffic data into one or more summaries;
standardize the one or more summaries into a predefined format;
analyze the VoIP traffic data with the VoIP traffic management rules to identify one or more VoIP traffic problems in the VoIP network;
create a ticket based on the one or more VoIP traffic problems in the VoIP network; and
output the ticket.

18. The non-transitory computer-readable medium of claim 17, where the one or more instructions to gather the VoIP traffic data include:

one or more instructions that, when executed by the one or more processors cause the one or more processors to automatically gather the VoIP traffic data for each call.

19. The non-transitory computer-readable medium of claim 17, where the one or more instructions to analyze the VoIP traffic data include:
one or more instructions that, when executed by the one or more processors, cause the one or more processors to:
analyze the VoIP traffic data by comparing the VoIP traffic data to one or more of:
preset VoIP traffic data, or
historic VoIP traffic data; and
where the one or more instructions to create the ticket include:
one or more instructions that, when executed by the one or more processors, cause the one or more processors to:
create the ticket based upon the VoIP traffic data exceeding a threshold level of the one or more of the preset VoIP traffic data or the historic VoIP traffic data,
where the threshold level is determined based on the VoIP traffic management rules.

20. The non-transitory computer-readable medium of claim 17, where the one or more server devices include one or more of:
an Internet protocol traffic system (IPTS) data collection component to:
collect the VoIP traffic data for a data analysis component by polling the signaling records from the VoIP network using operational measurements, monitoring the changes in the VoIP messaging patterns using operational measurements based on time, and polling the timing information, and
create call records for calls in the predefined format;
an international community information system (ICIS) to analyze one or more of:
a call attempt,
a network efficiency rating, or
an average call duration;
a signaling circuit correlation presentation (SciCop) system to analyze at least one of:
call blockages, or
call failures;
an international community information system (ICIS) web system to provide next day reporting; or
a data correction or presentation component to provide information associated with one or more of VoIP traffic correction or the VoIP traffic data.

* * * * *